S. W. McOMBER.
Tire-Tightener.

No. 169,017.

Patented Oct. 19, 1875.

WITNESSES
Eugene W. Johnson
George P. Upham

INVENTOR
S. W. McOmber,
Chipman Fisher & Co,
ATTORNEYS

N. PETERS, PHOTO-LITHOGRAPHER, WASHINGTON, D. C.

UNITED STATES PATENT OFFICE.

SANFORD W. McOMBER, OF NORTH MANCHESTER, INDIANA, ASSIGNOR OF ONE-HALF HIS RIGHT TO CHARLES H. WINTON, OF SAME PLACE.

IMPROVEMENT IN TIRE-TIGHTENERS.

Specification forming part of Letters Patent No. 169,017, dated October 19, 1875; application filed July 31, 1875.

*To all whom it may concern:*

Be it known that I, SANFORD W. McOMBER, of North Manchester, in the county of Wabash and State of Indiana, have invented a new and valuable Improvement in Carriage-Wheels; and I do hereby declare that the following is a full, clear, and exact description of the construction and operation of the same, reference being had to the annexed drawings making a part of this specification, and to the letters and figures of reference marked thereon.

Figure 1:
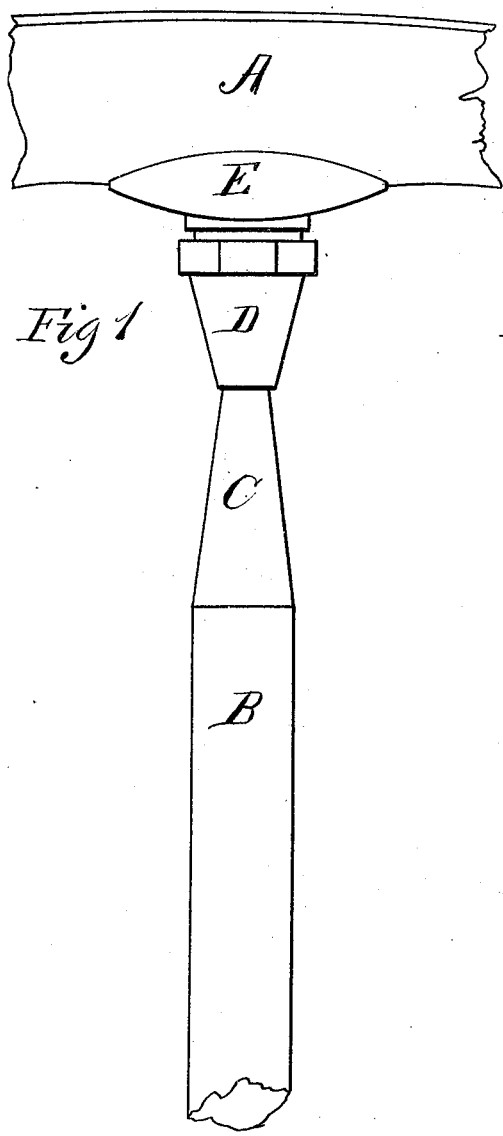
Figure 2:
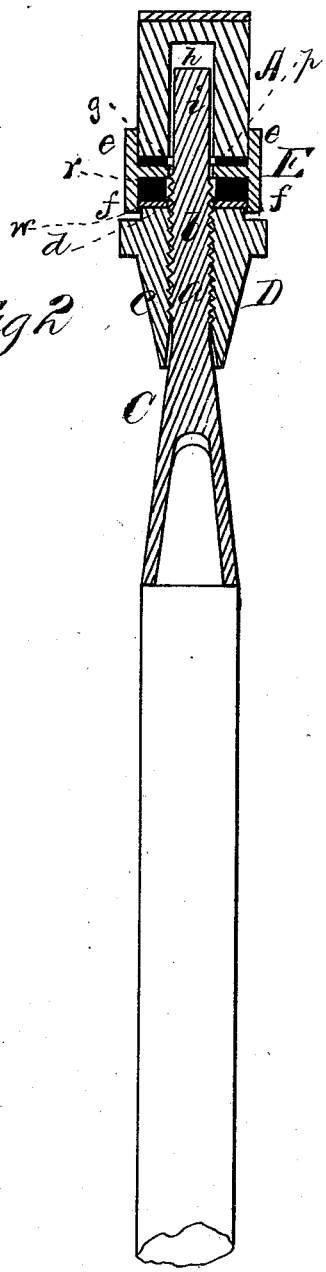

Figure 1 of the drawings is a representation of a plan view of my device, and Fig. 2 is a sectional view of the same.

This invention has relation to improvements in tire-tighteners, the object of which is to do away with the necessity of cutting the tires of vehicle-wheels when, from the shrinkage of the fellies, the tires have become loose.

The nature of the invention consists in the arrangement and novel construction of the various devices used for this purpose, as will be hereinafter more fully explained and claimed.

In the annexed drawings, A designates a section of a felly of a vehicle-wheel, and B is a spoke, the inner end of which is socketed in any suitable manner into a hub. The outer end of spoke B is shouldered and tapered, and is socketed into a strong metallic, preferably tapering, ferrule, C, which is provided with a solid metallic and cylindrical tenon, a, the extreme end of which is smooth, and that portion b between its smooth extremity and the ferrule proper screw-threaded, as shown at b, Fig. 2, for a purpose hereinafter explained. D represents an operating nut, the upper portion c of which is of the form of a frustum of a cone, the gripe for a wrench of octagonal form, and its extreme lower portion d rabbeted and of cylindrical form. E represents an H-shaped clip, the under side of which is longitudinally convex, and is provided with lateral flanges e adapted to inclose the felly, thereby preventing the said clip from rotating under circumstances hereinafter explained. This clip is provided upon its upper surface with a cylindrical recess, which is surrounded with an annular flange, f, and with an aperture, g, through which the smooth portion i of the tenon projects into a mortise, h, of corresponding size and form in the inner edge of the felly.

When nut D is forcibly set up it actuates the clip outwardly against the felly, which is thus forced concentrically outward against the tire, thereby taking up any slack which may have been occasioned by the shrinkage of the wood-work of the wheel.

The rabbet on the lower end of nut D is adapted to be snugly received into the recess in the inner surface of clip E, and it compresses a rubber packing-ring, r, which protects the thread of the screw on the tenon and in the nut, and effectually prevents vibration or rattling, and in order that the pressure upon the said ring may be made uniform, as well as to save it from being cut by the lower end of the rabbet, a suitable metallic washer, w, is interposed between them. I also propose to use an india-rubber plate, p, which may be made of any other sufficiently-elastic material, however, between the clip and felly, which will effectually protect the latter from shocks occasioned by the wheel coming in contact with a stone or other unyielding substance, and will prevent the rattling or vibration of the clip on the felly.

By this means the wheel is capable of being set up to the tire when the necessity occurs without danger of springing the spokes, and all rattling or vibration of the various devices employed is effectually prevented.

What I claim as new, and desire to secure by Letters Patent, is—

1. The H-shaped clip having lateral flanges e, and the annular flange f embracing the felly and nut D, substantially as shown and described.

2. The H-shaped clip having the flanges e f, the rabbeted nut D, the ferrule C with screw-threaded portion a, the washer w, and packing r, all constructed and combined substantially as described.

3. The combination, with a felly and a clip for thrusting the same out against the tire of an elastic rubber plate, p, interposed between the clip and felly, substantially as specified.

In testimony that I claim the above I have hereunto subscribed my name in the presence of two witnesses.

SANFORD W. McOMBER.

Witnesses:
CHARLES H. WINTON,
JACOB HARTER.